April 12, 1966  N. S. VALENTINE ETAL  3,245,724
APPARATUS FOR MANIPULATING ARTICLE CONTAINERS
IN CONVEYING INSTALLATIONS
Filed April 6, 1964  4 Sheets-Sheet 1

Inventors
Norman S. Valentine
Maurice C. Lemon
By
Watson, Cole, Grindle & Watson
Attorneys

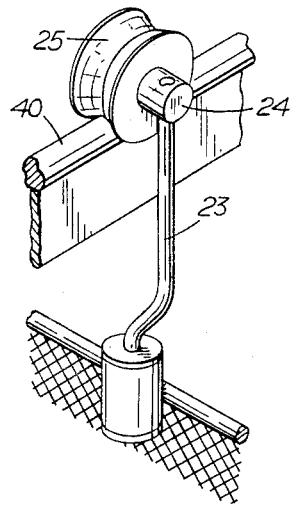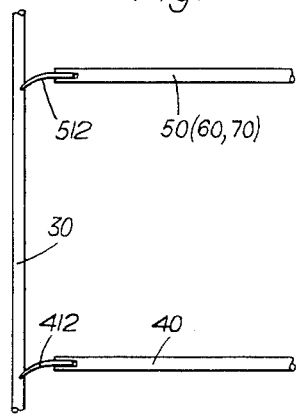

April 12, 1966   N. S. VALENTINE ETAL   3,245,724
APPARATUS FOR MANIPULATING ARTICLE CONTAINERS
IN CONVEYING INSTALLATIONS
Filed April 6, 1964   4 Sheets-Sheet 4

Inventors
Norman S. Valentine
Maurice C. Lemm
By
Watson, Cole, Grindle & Watson
Attorneys ized Patent Office
3,245,724
Patented Apr. 12, 1966

3,245,724
APPARATUS FOR MANIPULATING ARTICLE CONTAINERS IN CONVEYING INSTALLATIONS
Norman Stanley Valentine, Lancing, and Maurice Charles Lemon, Reigate Heath, England, assignors to Polymark Limited
Filed Apr. 6, 1964, Ser. No. 357,657
Claims priority, application Great Britain, Apr. 9, 1963, 14,094/63
4 Claims. (Cl. 302—3)

The present invention relates to apparatus for manipulating article containers in conveying installations, and is particularly directed to the problem of collecting a predetermined quantity of articles being handled in conveying equipment and causing said containers to come into movement after a predetermined quantity or weight of articles has been collected. This problem arises for example in the manipulation of articles in laundries, drycleaning establishments and the like where articles being manipulated are collected into containers, for example at a classifying station where articles received for treatment are distributed to different containers for the various treatments, for example by means of a pneumatic conveyor plant.

The present invention relates to conveying equipment wherein a container is supported in a filling position on an inclined support rail and is retained in the filling position by yieldable means responsive to the weight of articles collecting in said container so that on attaining a predetermined weight the containers are released and travel onward on the rail.

Preferably one of the support rollers from which the container is suspended is adapted to rest against a weighing rail portion so that on attainment of a predetermined weight of the container due to filling thereof said rail portion is deflected to release the container and allow it to move onward on the support rail.

The weighing rail portion may be operatively linked to a counterweight so that on attainment of a predetermined weight in the container the weighing rail portion is deflected to allow the container to move onwards on the support rail.

The two support rollers pertaining to one container may be engaged from above by a rocker member which holds the container in position on the support rail at the filling position, with one of said rollers resting on the weighing rail portion, said weighing rail portion being pivotally mounted and linked through a connecting link to a horizontal arm bearing a counterweight whereby on attainment of a predetermined weight the weighing rail portion is depressed and the counterweight is lifted, the depression of the roller resting on the weighing rail portion allowing the rocker member to release the filled container, said rocker member being further arranged to permit an empty container to move onward to replace the filled container.

In one form of equipment in accordance with the present invention the containers may consist of openwork structures supported at the top by a rigid frame and closed at the bottom by a detachable member whereby the contents of the container can be readily discharged when required. The top rigid frame carries upstanding supports with horizontal end parts supporting suitable guide rollers which run each on their own rail section. The guide rollers may be of diabolo shape, being deeply grooved with tapered sides and a minimum diameter at the centre, and the rails may consist of round rods or flat strips. These guide rollers are carried by vertical extending rod portions journalled at their lower ends in bearing sleeves attached to the framework and thereby the roller mountings are adapted to turn freely about a vertical axis for a purpose which will be apparent later. Preferably the vertical support rods are cranked in such manner that the vertical axis of rotation of the roller supports lies directly beneath the centre of each roller. At the container filling stations containers are supported by rails which are inclined to an extent which allows the filled containers, when released, to travel onward by gravity for further manipulation.

Preferred embodiments of the invention are illustrated on the accompanying drawings in which:

FIG. 3 is a detail view showing the arrangement of the diabolo-shaped rollers,

Figure 5:
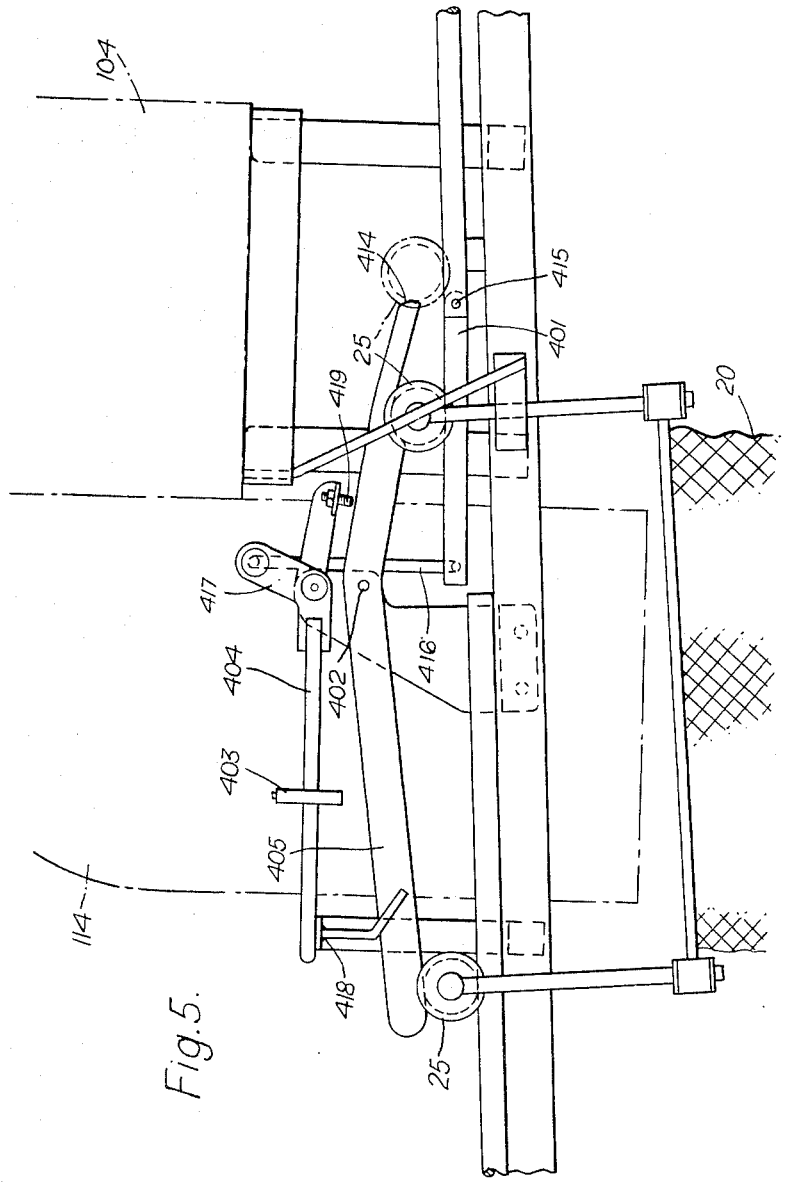

FIG. 4 indicates diagrammatically the means whereby containers supported by inclined rails during loading are transferred on to a single rail for conveyance purposes, and FIG. 5 illustrates on a larger scale the detail arrangements of the weighing parts of the equipment.

Figure 1:
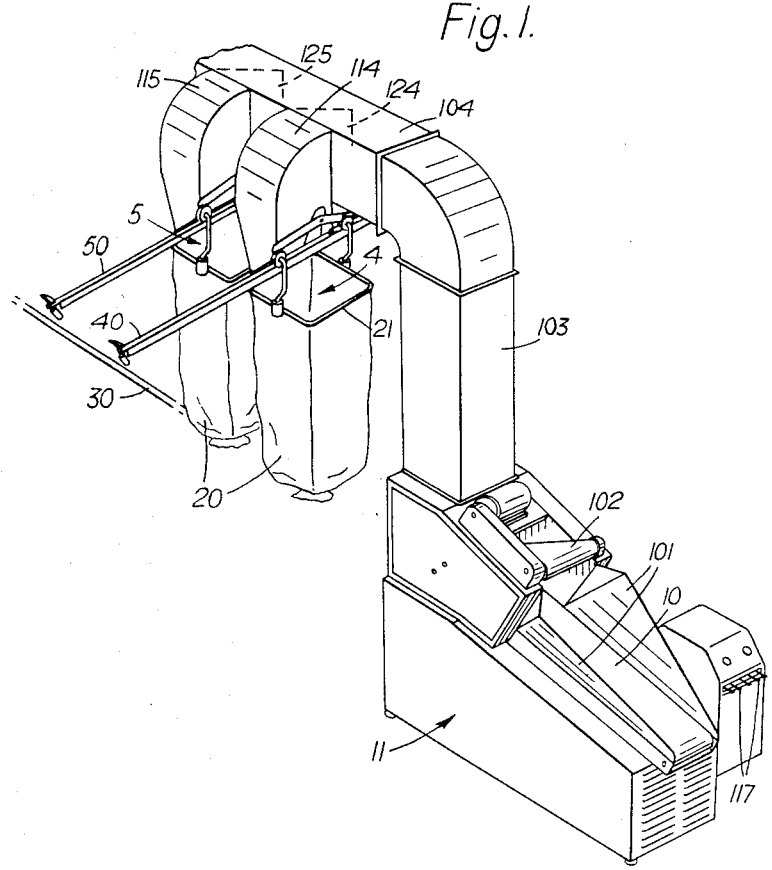
FIG. 1 is a general view of typical equipment incorporating the present invention.

Referring first to FIG. 1 of the drawings, it will be seen that openwork mesh or basket-like containers 20 are supported on slightly sloping rails 40 at filling stations where they receive articles from outlets 114, 115 of a pneumatic distribution device 103, 104 and controlled by a keyboard 117 so that the articles are delivered to any of a number of filling stations, two being indicated on FIG. 1 by way of example at 4 and 5.

Articles to be delivered into the several containers 20 may be received by an upwardly moving conveyor belt 10 running between side walls 101 so that articles placed in the trough defined by the belt 10 and the side walls 101 are carried upwardly along the conveyor, then pass beneath a further belt assembly 102 so that successive articles placed on the conveyor enter the base of a vertical feed duct 103 through which an upwardly flowing current of air is produced by an air fan and impeller system located in the device 11 beneath the conveyor belt 10. The vertical feed duct 103 runs into a horizontal duct section 104 provided with a series of outlets 114, 115 and pivotally movable flap members are provided as indicated in dotted lines at 124, 125, which are adapted to divert the conveyed articles selectively into one or other of the outlets 114, 115 according to the control exerted by the operator at the control unit 117, the several control keys thereof being operatively linked to the flaps 124, 125.

Each of the containers 20 comprises a rigid top frame 21, also shown in part on FIG. 3, the container 20 conveniently comprising a mesh or openwork tubular member which may be closed at the bottom in any convenient manner, for example by bunching and tying.

The frame 21 is provided at the centre of two opposite sides with a bearing sleeve 22 providing a journal mounting for the lower end of a cranked vertically extending rod 23 carrying at the upper end a horizontally extending spindle 24 providing a mounting for a diabolo-shaped support wheel 25, the two support wheels providing the means for suspending the containers 20 from the support rails shown as 40, 50 and so on.

At the loading positions shown in FIG. 1 the containers 20 are supported by inclined rails 40, 50 and they are subsequently transferred from such rails by means to be described, to a feeder rail 30 to support the containers while they are in transit to any desired point of utilisation.

Figure 2:
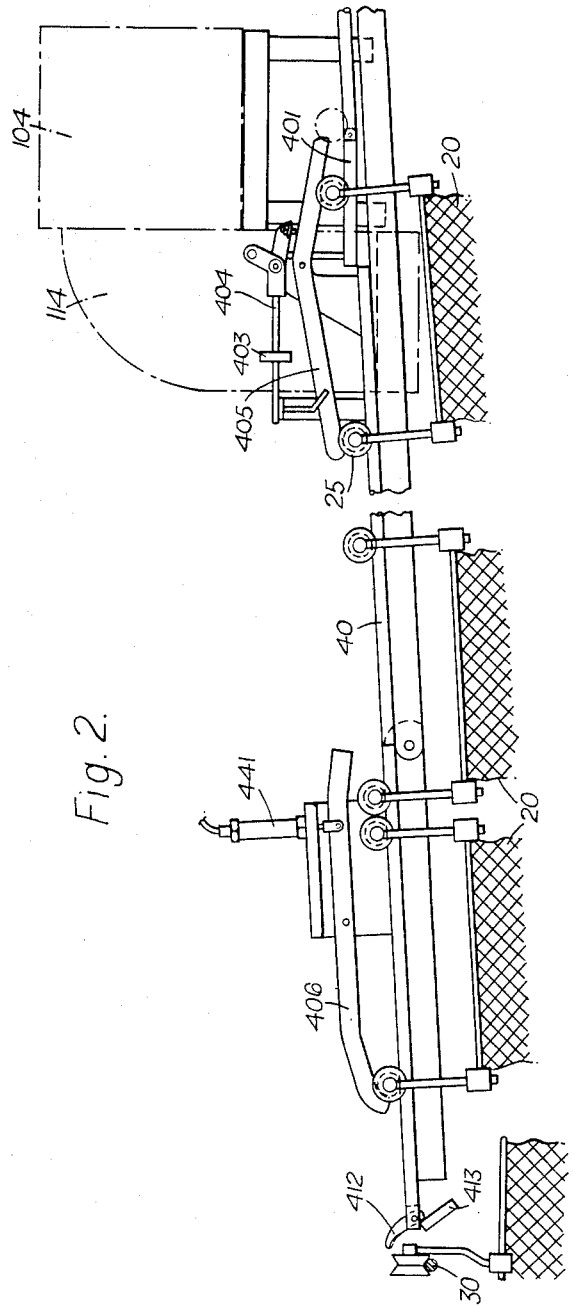
FIG. 2 is a side view showing the means for loading the containers and for retaining them in position until a predetermined weight has been collected in each container.

As shown in FIGS. 2 and 5 the containers 20 are held in the loading position beneath the respective delivery members 114 by means of a rocker 405 which engages both rollers 25 of the container 20 being filled. The trailing roller 25 rests on a pivoted rail section 401 hereinafter referred to as the weighing rail. This rail is interposed in the length of the support rail 40 and is adapted to be depressed against the action of a counter weight 403 through a linkage to be described, so that on attaining a predetermined weight in the container 20 the rail 401 is depressed, allowing the trailing roller to move onward on to the support rail 40. The rocker 405 is pivoted at an intermediate point 402, the two arms being arranged at an angle one to the other so that when the rail 401 is in its uppermost position the two arms of the rocker 405 engage the two rollers 25 and prevent movement of the filling container 20. As soon as the weight in the container 20 is sufficient to depress the rail 401 and lift the counterweight 403, the downward movement of the trailing roller 25 allows the rocker to move clockwise and allows the other end of the rocker 405 to lift sufficiently to release the roller 25 so that the container 20 moves onward until it is stopped by a catch lever 406 or by other containers 20, the foremost of which is held by the catch lever 406.

Oncoming containers on the upper part of the rail 40 are held back during the weighing operation by the end face 414 of the rocker 405. As a filled container 20 passes away from the rocker 405 the longer left-hand arm is no longer subjected to the action of any roller 25 and the rocker thus moves slightly in the counter clockwise direction up to a stop 419 so that the end face 414 releases the leading roller 25 of the next container 20 which passes over the rail 401 and lifts the forward tip of the left-hand arm of the rocker 405 also causing the other arm to rest against the trailing roller 25 now resting on the weighing rail 401, these parts being so proportioned that the container 20 is held in position by the rocker 405 during the filling operation, the next oncoming container being held back by the end face 414 of the rocker.

The weighing rail 401 is pivotally mounted at its rear end on a pivot 415 and is connected to a link 416 pivoted to one arm of a bell crank 417 the other arm of which carries a horizontally extending calibrated arm 404 bearing the counterweight 403 which is adjustable thereon. The free end of the arm 404 rests against a stop 418 until the weight of the container 20 being filled is sufficient to depress the weighing rail 401. It will be seen that the counterweight 403 holds the weighing rail 401 in its uppermost position until a predetermined weight determined by the position of the counterweight 403 on the arm 404 is attained. When this occurs the leverage transmitted by the link 416 to the bell crank 417 is sufficient to lift the arm 404 away from the stop 418, with a progressively increasing leverage due to the positioning of the arm of the bell crank 417 to which the link 416 is attached. Thus as soon as movement of the weighing rail 401 commences a greater leverage is exerted resulting in a positive movement of the rail 401 and of the connected parts, namely the link 416, the bell crank 417 and the arm 404 carrying the counterweight 403; this arrangement provides a definite release action for the filled container and ensures reliable operation of the weighing device.

The operation of the equipment so far described is as follows: empty containers 20 are supplied to the filling station 4, 5 and so on (two of them being shown on the drawings) where they are retained by the rocker members 405 and similar rocker members on the other rails 50, 60 and so on.

Each of the delivery outlets 114, 115 and so on is associated with a similar container 20 it being understood that in most cases there will be substantially more delivery outlets and containers being filled than is shown for example on FIG. 1 of the drawings. The operator places successive articles on the conveyor belt 10, and as this is done the appropriate key on the keyboard 117 is depressed to actuate the respective flap 124, 125 and so on, to ensure that the article is delivered to the required outlet 114, 115 and so on.

As this operation proceeds, the point is reached when at least one of the containers 20 being filled attains a predetermined weight which is sufficient to cause the diabolo rollers 25 concerned to depress the rail 401 thereby releasing the filled container which runs onward by gravity to the storage position where it is stopped by a catch lever 406. In many cases the apparatus may be arranged so that other filled containers may run onward on the rails 40, 50 until they come into engagement with other filled containers already at the storage position so that a number of filled containers may be held ready for delivery on to the conveyance rail 30.

It will be understood that during the filling operation each container is supported from the rails 40, 50 and so on. By a suitable selective control operable by the same or by a different operator, a filled container from any one of the rails 40, 50 and so on may be released to move on to the feeder rail 30. The operation of this control actuates the air cylinder 441 to tilt the catch lever 406 momentarily to allow the required filled container to move downwardly towards the rail 30.

The catch lever 406 is controlled by an air cylinder 441 and is pivoted at an intermediate point, the front portion being turned downwardly to engage the leading roller 25 of the foremost container 20 at the storage position. When this container is to be released the air cylinder 441 is operated, tilting the catch lever 406 in the clockwise direction and thus releasing both rollers of the foremost container 20. The opposite end of the lever 406 has an end part which is turned slightly downwardly and is adapted, when displaced by the air cylinder 441 to engage the trailing roller 25 of the next container 20. When the catch lever 406 returns to the position shown, the forward bent tip of the lever comes in a position to engage the leading roller 25 of the next container, the trailing roller being released to allow the container to move forward to a small extent until the leading roller is stopped by the forward tip part of the lever 406. Thus the lever 406 serves as an escapement allowing one container to move forward for transfer to the feeder rail 30 and engaging the next container to prevent movement thereof.

The rails 40, 50 and so on terminate at a level slightly above the level of the rail 30 and the gap between the ends of the rails 40, 50 and so on and the rail 30 is bridged by pivotally movable switch rails 412 which may be provided with a counterweight 413 as shown in FIG. 2 so that they normally project upwardly, and said rails 412 are curved in plan, as shown in FIG. 4, so that as the diabolo rollers 25 run off the ends of the rails 40 the switch rails 412 bridge the gap between the ends of the rails 40 and the rail 30 and cause the diabolo rollers to make an initial rotary movement about the vertical axis of the bearing 22 after which the rollers drop in turn on to the rail 30 which causes them to complete their movement through 90° with transfer of the container on to the rail 30.

The containers are now supported by the rail 30 and are conveyed along this rail either by gravity, with the rail running in a slightly downward path towards the point of use, or are engaged by conveyor belts, cables or the like which effect positive movement of the containers 20 supported on the rails 30. If gravity feed is adopted lifting devices may be provided as required in order to lift the conveyors to a higher level and to provide a sufficient slope to enable the containers to continue their conveyance movement.

Any suitable means are provided for returning empty containers to the upper ends of the rails 40, 50 and so on and to ensure that an empty container is brought into position as soon as a filled container leaves the filling station 4, 5 and so on.

What we claim is:

1. Weighing device for conveying apparatus for suspended containers supported on carrier rails by pairs of spaced grooved rollers mounted on the containers for free steering movement comprising a vertically displaceable rail section to receive one of said grooved rollers, counterbalance means acting on said displaceable rail section to allow downward movement of said displaceable rail on application of a predetermined weight load to said displaceable rail, a pivotally mounted rocker member extending above said displaceable rail and spanning the displaceable rail section and a part of the carrier rail adjacent said section, a pivot mounting for said rocker member, one end of rocker member adapted to engage one roller of a container resting on the displaceable rail section, the other end of said rocker member engaging the other roller of said container to prevent rocking movement of the rocker member and to retain said container with said one roller in contact with said displaceable rail section, means operative on displacement of said displaceable rail section due to a predetermined weight load applied to the said one roller on said displaceable rail section to cause the rocker member to release both rollers and allow the container to move onwardly on the conveyor rail clear of the rocker member, and means on said rocker member to retain a roller of a next following container and to allow said container to move forwardly after release of the preceding container until said second container is engaged with one of the rollers of said second container on said displaceable rail section and the other roller engaged by the opposite end of the rocker.

2. Apparatus according to claim 1, wherein the weighing rail portion is connected through a link to a bell crank, one arm of which carries a projecting arm carrying an adjustable counterweight, while the other arm is so placed that on displacement of the weighing rail portion, progressively increasing leverage is transmitted to the bell crank to ensure a well-defined release action.

3. Apparatus according to claim 1, wherein the support rollers for the containers consist of deeply grooved diabolo-shaped rollers and transfer from the support rail on to a feeder rail is effected by means of a pivotally mounted switching rail section spanning the gap between the ends of the support rails and the feed rail so that the diabolo-shaped rollers are caused to turn through 90°, each about its own vertical axis when transferring from the support rails on to the feed rail.

4. Weighing device according to claim 1 comprising a bracket member extending upwardly from the conveyor rail adjacent the displaceable rail section, the rocker member being pivoted to said bracket and including a rearward part adapted to engage the roller resting on the displaceable rail section, and a forward part directed towards the conveyor rail and adapted to engage the other roller of the container to retain both rollers until the displaceable rail section allows the rollers disposed on the latter to initiate rocking movement of the rocking member to release the rollers, the roller previously supported on the displaceable rail section then passing idly beneath the rocker member, a rearwardly projecting part on said rocker member to retain the leading roller of the next following container and to allow said roller to move onwardly until engaged by the opposite end of the rocker member, the other roller of the next following container then resting on the displaceable rail section, a bell crank pivotally supported on said bracket member and operatively linked to the displaceable rail section, a projecting arm carried by said bell crank, a displaceable weight on said arm for variable loading of the displaceable rail section, and stop means on said bracket for limiting the free movement of the rocker member.

References Cited by the Examiner

UNITED STATES PATENTS

| | | | |
|---|---|---|---|
| 743,786 | 11/1903 | White | 104—93 |
| 998,540 | 7/1911 | Manes | 177—163 |
| 2,035,281 | 3/1936 | Braune | 214—41 |
| 2,067,981 | 1/1937 | Ohlson | 104—91 |
| 3,141,705 | 7/1964 | Valentine | 302—28 |

EVON C. BLUNK, *Primary Examiner.*

ANDRES H. NIELSEN, *Examiner.*